United States Patent
Ramaswamy (10) Patent No.: US 7,246,109 B1
(45) Date of Patent: Jul. 17, 2007

(54) METHOD AND APPARATUS FOR BROWSING USING POSITION INFORMATION

(75) Inventor: Muralidharan Ramaswamy, Danbury, CT (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/414,454

(22) Filed: Oct. 7, 1999

(51) Int. Cl.
 *G06F 17/18* (2006.01)

(52) U.S. Cl. ............................................. 707/3; 707/10
(58) Field of Classification Search ...................... 707/3, 707/4, 10; 705/27; 701/201, 208, 200; 342/357.13; 709/218, 229
See application file for complete search history.

(56) References Cited

U.S. PATENT DOCUMENTS

| | | | | |
|---|---|---|---|---|
| 5,802,492 A | * | 9/1998 | Delorme et al. ............. | 701/200 |
| 5,808,613 A | | 9/1998 | Marrin et al. ................ | 345/355 |
| 5,852,810 A | | 12/1998 | Sotiroff et al. ................ | 705/27 |
| 5,893,093 A | | 4/1999 | Wills ............................ | 707/5 |
| 5,930,474 A | | 7/1999 | Dunworth et al. .......... | 395/200 |
| 6,107,961 A | * | 8/2000 | Takagi .................... | 342/357.13 |
| 6,125,367 A | * | 9/2000 | NA ........................ | 707/104.1 |
| 6,202,023 B1 | * | 3/2001 | Hancock et al. ........... | 701/201 |
| 6,240,425 B1 | * | 5/2001 | Naughton ................ | 707/104.1 |
| 6,252,545 B1 | * | 6/2001 | Da et al. .................. | 342/357.1 |
| 6,338,085 B1 | * | 1/2002 | Ramaswamy ............... | 709/217 |
| 6,343,317 B1 | * | 1/2002 | Glorikian .................... | 709/218 |
| 6,442,544 B1 | * | 8/2002 | Kohli ............................. | 707/5 |
| 6,542,813 B1 | * | 4/2003 | Kovacs ........................ | 701/208 |
| 6,741,188 B1 | * | 5/2004 | Miller et al. ............. | 340/995.1 |

FOREIGN PATENT DOCUMENTS

| | | |
|---|---|---|
| EP | 0777188 A2 | 11/1996 |
| EP | 0838761 A2 | 4/1997 |
| EP | 0860787 A2 | 8/1998 |
| WO | WO9714049 | 4/1997 |
| WO | WO9714053 | 4/1997 |
| WO | WO9714054 | 4/1997 |
| WO | WO9714055 | 4/1997 |
| WO | WO9714056 | 4/1997 |
| WO | WO9731305 | 8/1997 |
| WO | WO9747143 | 12/1997 |
| WO | WO9836343 | 8/1998 |
| WO | WO9905616 | 2/1999 |
| WO | WO9906934 | 2/1999 |
| WO | WO9714057 | 4/1999 |

OTHER PUBLICATIONS

"Geospatial Metadata Querying and Visualization on the WWW Using Java4™ Applets" by Alper et al, Information Visualization '96, Proceedings IEEE Symposium, 0-8186-7668-X.

Navigable Image Database: Sanfrancisco "Ente the San Francisco Navigable Image Database (Highly Portable Version) http://www.fourthplanet.com/poi.sf–nidb.htm, p. 1–3.

San Francisco Navigable Image Database:Table of Contents for : Coit Tower; http:www.fourthplanet.com/poi/sf–nidb/toc/CT_TOC.htm. p. 1–3.

* cited by examiner

*Primary Examiner*—Sanjiv Shah
(74) *Attorney, Agent, or Firm*—Larry Liberchuk (57) ABSTRACT

A system and method are provided to allow a user to search and locate information which is accessible over a computer network. Global Positioning System type coordinate information is used as search criteria to locate information on the computer network. The system and method allow the user to locate information related to a particular geographic area. Search criteria, such as an area or point on a geographic map, is entered by the user. Hypertext documents are then located in accordance with the search criteria and position information associated with the hypertext documents.

26 Claims, 6 Drawing Sheets

METHOD AND APPARATUS FOR BROWSING USING POSITION INFORMATION

FIELD OF THE INVENTION

The present invention pertains generally to the field of computer systems. More particularly, the invention relates to using Global Positioning System (GPS) type coordinate information to search and locate information accessible through a computer network.

BACKGROUND OF THE INVENTION

As computer innovation sweeps across the business and personal consumer markets, the Internet is growing in an exponential rate. It is estimated that over 30 million people worldwide use the Internet with 100 million predicted to be on the "net" within a few years.

The Internet is a network of computers and other devices linked together by various media, enabling all the computers to exchange and share data. Data may be transferred using a communication protocol such as Transmission Control Protocol/Internet Protocol (TCP/IP). The Internet can provide information about a myriad of corporations, products, as well as educational, science, technology, research, business, entertainment information and services. Computers that initiate requests for information (i.e., service) are referred to as "clients", and computers that respond to service requests are referred to as "servers." Hypertext Transfer Protocol (HTTP) is typically used to facilitate communication between clients and severs.

One important structure of the Internet is the World Wide Web ("web"). The web is a collection of information formatted as hypertext-based documents (i.e., web pages). A related set of web pages or documents maintained by a single web server is often referred to as a web site. This information can be distributed through computers around the world connected to the Internet. Web pages are basically a computer data file on a host operating as a web server within a given domain name (e.g., TV.com). The web server receives inquiries from clients (i.e., other computers) via the Internet and downloads the web page data in the file to the client making the inquiry. The web page may comprise multiple pages of information including messages, audio and graphical information, and combinations thereof.

The web pages are written using a programming language called Hypertext Markup Language (HTML). Other hypertext programming languages may also be used to create the hypertext documents such as Dynamic HTML (DHTML), extensible Markup Language (XML), Synchronized Multimedia Integration Language (SMIL). Generally, HTML commands, i.e., tags, provide functions for defining the layout/format of the web page, embedding sound and images in the web page and adding links (i.e., hyperlinks) to other web pages or web sites. These links allow the user to select a word, phrase or image (referred to as a "hypertext anchor") to go to, or receive information from, a web site which may be located on a remote server.

Navigation tools, such as network browsers, are typically used by clients to access, process and display a web page. Examples of well-known browsers are Netscape and Internet Explorer. These browsers provide a set of instructions or commands that correspond to tags available in HTML. The browsers compare tags found embedded in the web page and execute the procedures corresponding to the matched browser command.

Hyperlinks, as discussed above, are typically identified as character strings, such as a Uniform Resource Locator (URL) (i.e., an address to the web page). If the URL of the web page is not known, search engines allow users to search for web pages. Access to the search engines is provided via the browsers. Well-known conventional search engines include, for example, Searches, Yahoo!, Excite and Alta Vista. These search engines accept search criteria based on a "search text" from the client and search for web documents that match the search criteria.

The search text typically consists of one or more descriptive words related to the subject matter to be found on the web page. For example, to locate a web page relating to audio compact disk (CD) players manufactured by XYZ Corporation, the search text may be: "XYZ AND audio AND CD." The search engines would then display results ("hits") based upon this search criteria (i.e., the URL of, or hyperlink to, web pages containing these words).

One problem with these conventional search engines is that the results obtained using these search texts generally have no relation to geographic position. For example, the web page hits maybe related to businesses and services located around the United States or the world. However, the client initiating the search may only be interested in locating web pages (e.g., from businesses) within a specific geographic area. This would be particularly advantageous to a client located in that geographic area or possibly moving to that area.

U.S. Pat. No. 5,852,810 describes a system for listing and locating housing in specific geographic regions. The system includes a web home page and a housing information database. A map is displayed when the web home page is accessed by a user. The user narrows searches to geographic areas by selecting specific areas of interest on the map. Housing information related to the area of interest is then displayed for the user.

The information contained within the database, however, is merely a collection of data submitted by property managers. This information is like a real estate listing for a geographic area, i.e., similar to the yellow page directory for businesses within an area. In addition, all of the administration and updating of the database must be performed by the property managers.

This system, however, is not a web page search engine. It does not allow a user to locate web pages using geographic coordinates. The searchable information is limited to the information contained in the database—rather than the universe of information available on the web. In addition, this system is hampered by the need to be administered and maintained by the property managers.

Conventional search engines also have features similar to business directories. These search engines maintain databases containing list of businesses. A user may enter his home address, for example, and receive a list of businesses in the vicinity of the user's home address. These business directory features, however, suffer many of the same shortcomings discussed above.

One of the principle advantages of the web is that anyone (e.g., a small business) can create a web page that is "locatable" by a client (e.g., a consumer) on the web. There is no requirement to register the web page in a proprietary list, or submit the web page to a controlled database, to be accessible on the web.

With the tremendous growth of the Internet, the web is a valuable resource of information and business tool. A well-crafted web page, for example, can spark both e-commerce and local "walk-in" business for a business entity. To generate "walk-in" type business, a web page should be in someway linked to, and locatable based upon, geographic information. This will allow users to find web pages within or near a geographic area.

There thus exists in the art a need for improved systems and method for searching the web using searches based upon geographic coordinate-type information. It is also desirable to provide servers capable of facilitating access to web pages created using geographic coordinate-type information.

BRIEF SUMMARY OF THE INVENTION

It is an object of the present invention to address the limitations of the conventional search engines and browsers discussed above.

Generally, embodiments of the present invention are directed to browsing techniques that use geographic coordinates. This enables clients to locate hypertext documents such as web pages of services, companies and shops near a particular area that maybe near their residence or business location. The web pages have position information associated therewith to facilitate searching.

In one aspect of the present invention, a server for providing information, which is accessible through a computer network, includes a controller including an interface to the computer network and a graphical mapping system capable of generating a map of a geographic area for transmission through the interface. A search engine is configured to locate hypertext documents in accordance with a request received through the interface. The request includes search criteria based on geographic position information.

In another aspect of the invention, a machine-readable storage medium including program codes, which upon execution, cause a machine to receive search criteria based upon a geographic position and to search for world wide web pages in accordance with the search criteria.

One advantageous embodiment of the invention relates to the creation of hypertext documents that are created using geographic position information. For example, the name of a world wide web page is based on longitude and latitude coordinates. This allows a search engine in accordance with another embodiment of the invention to quickly locate the web page. In another embodiment, the search engine may also use an index containing correlated position and web page information.

These and other embodiments and aspects of the present invention are exemplified in the following detailed disclosure.

BRIEF DESCRIPTION OF DRAWINGS

The features and advantages of the present invention can be understood by reference to the detailed description of the preferred embodiments set forth below taken with the drawings, in which.

DESCRIPTION OF THE PREFERRED EMBODIMENTS

Figure 1:
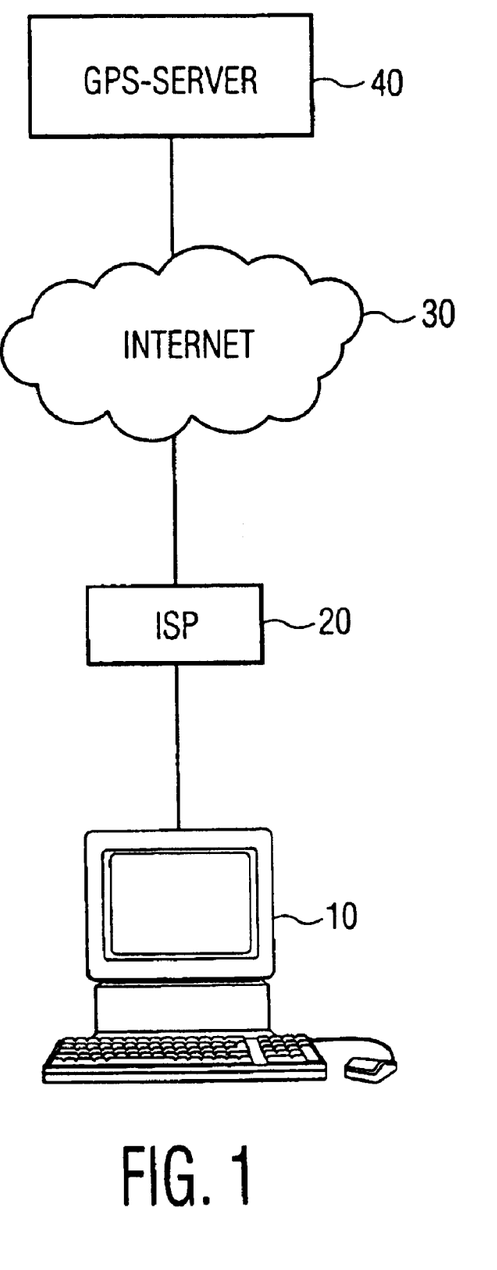
FIG. 1 is a block diagram of a client/server network in accordance with one aspect of the present invention.

Referring now to FIG. 1, a network configuration is illustrated including a client 10 and a GPS-server 40. The client 10 is connected to the GPS-server 40 via Internet 30 and an Internet Service Provider (ISP) 20. Of course, the invention is not limited to this type of network configuration, other network configurations such as an Intranet may be used.

Figure 2:
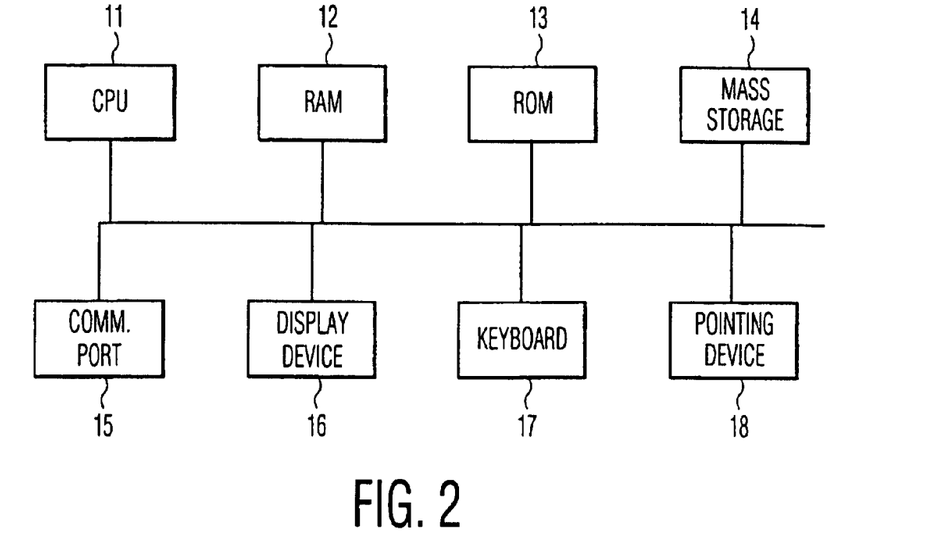
FIG. 2 is a block diagram of a client computer system.

FIG. 2 is a block diagram of the client 10. The client 10 includes a CPU 11, which performs the processing functions, a random access memory 12 (RAM), a read only memory 13 (ROM) and mass storage 14. The ROM 13 is used to store at least some of the program instructions that are to be executed by the CPU 11, such as portions of the operating system or basic input-output system (BIOS), and the RAM 12 is used for temporary storage of data. The mass storage 14 may be any conventional non-volatile device capable of storing large volumes of data, such as a magnetic or optical disk or tape.

The client 10 also includes a communication port 15 suitable for connection to the ISP 20. The communication port 15 enables the CPU 11 to communicate with external devices on the Internet 30 via the ISP 20. For example, a conventional modem (not shown) and a dedicated telephone line for establishing communication with the ISP 20 may be used. Other data network interfaces, however, may be used such as a cable television modem, or an Integrated Services Digital Network (ISDN) adapter.

A display device 16, a keyboard 17 and a pointing device 18 are included in the client 10. The display device 16 may be any visual display device such as a Cathode Ray Tube (CRT) or a Liquid Crystal Display (LCD). The pointing device 18 may be any conventional device for moving a cursor or pointer on the display device, such as a trackball, mouse or stylus.

The client 10 also includes a browser 19. In one embodiment, the browser 19 is implemented by execution of a sequences of instructions that cause the CPU 11 to perform steps according to the invention. For example, the instructions may be contained in the RAM 12 or mass storage 14 or be loaded from a remote device via the Internet 30. The downloaded instructions may be directly executed by the CPU 11 or stored in memory.

Figure 3:
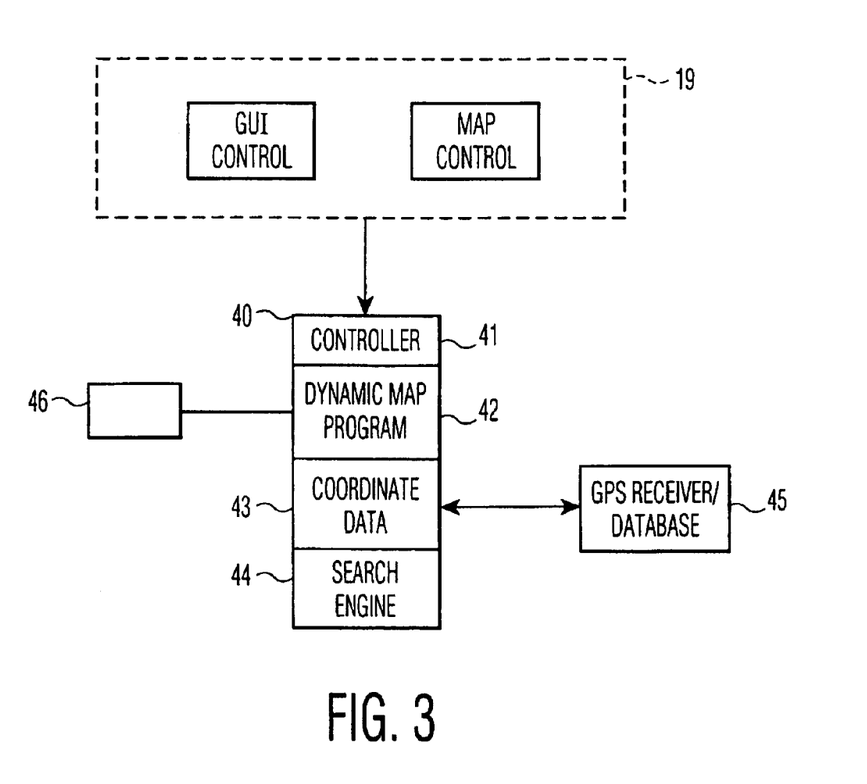
FIG. 3 is a block diagram showing different functions and features of the client/server system in accordance with another aspect of the invention.

FIG. 3 shows various features and functions of the browser 19 and the GPS-server 40. In this embodiment, the GPS-server 40 includes a controller 41, a dynamic map program 42, coordinate data 43 and a search engine 44. The controller 41 provides a conventional interface with the Internet 30 and allows the GPS-server 40 to communicate with the client 10. The controller 41 may have the same hardware architecture as shown in FIG. 2 for the client 10.

The dynamic map program 42 and the search engine 44 are based on software that are executed by the controller 41 within the GPS-server 40. In other embodiments, hardware circuitry may be used in place of, or in combination with, software instructions to implement the invention.

The dynamic map program 42 may be any conventional graphics utility that can generate a geographic map. The dynamic map program 42 is capable of expanding or narrowing the geographic area being displayed. A geographic database 46 may be included in the dynamic map program 42 or such data may be received/downloaded from other sources such as a CD ROM or via the Internet 30 as needed.

Figure 6:
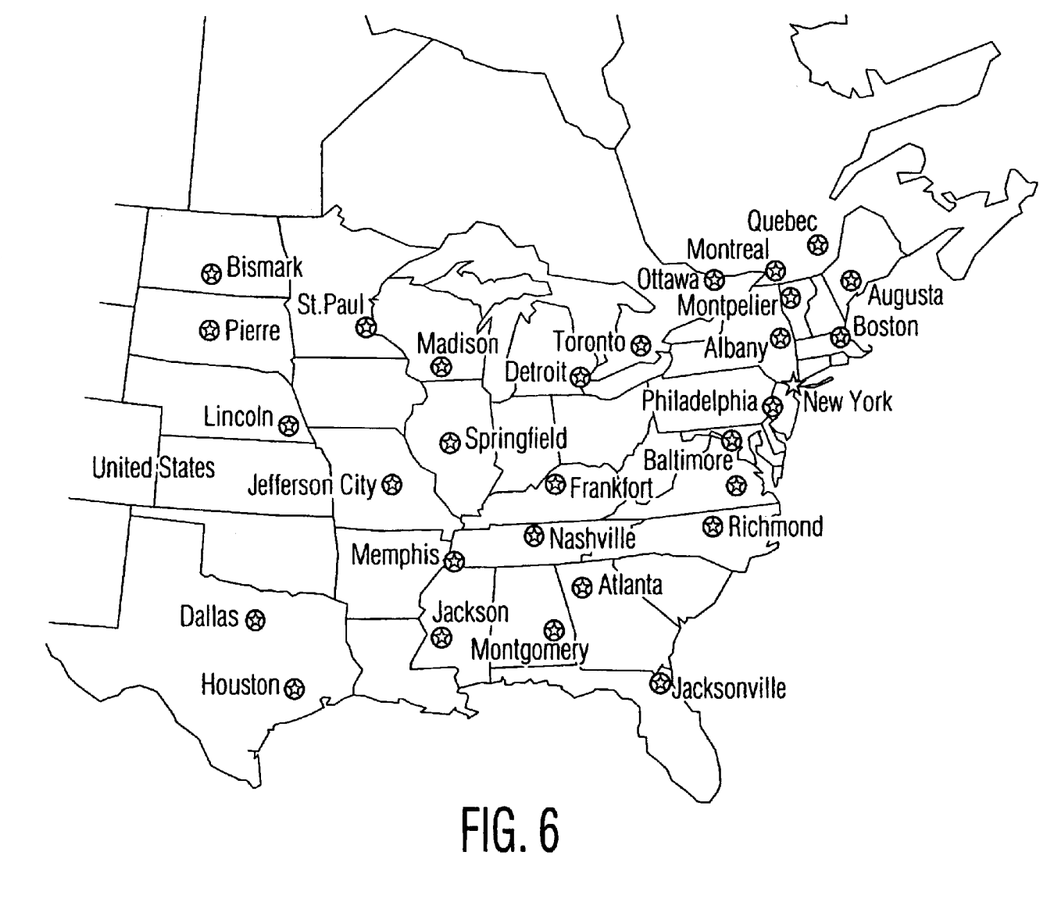
FIGS. 6–8 are geographic maps in accordance with yet another aspect of the invention.
Figure 7:
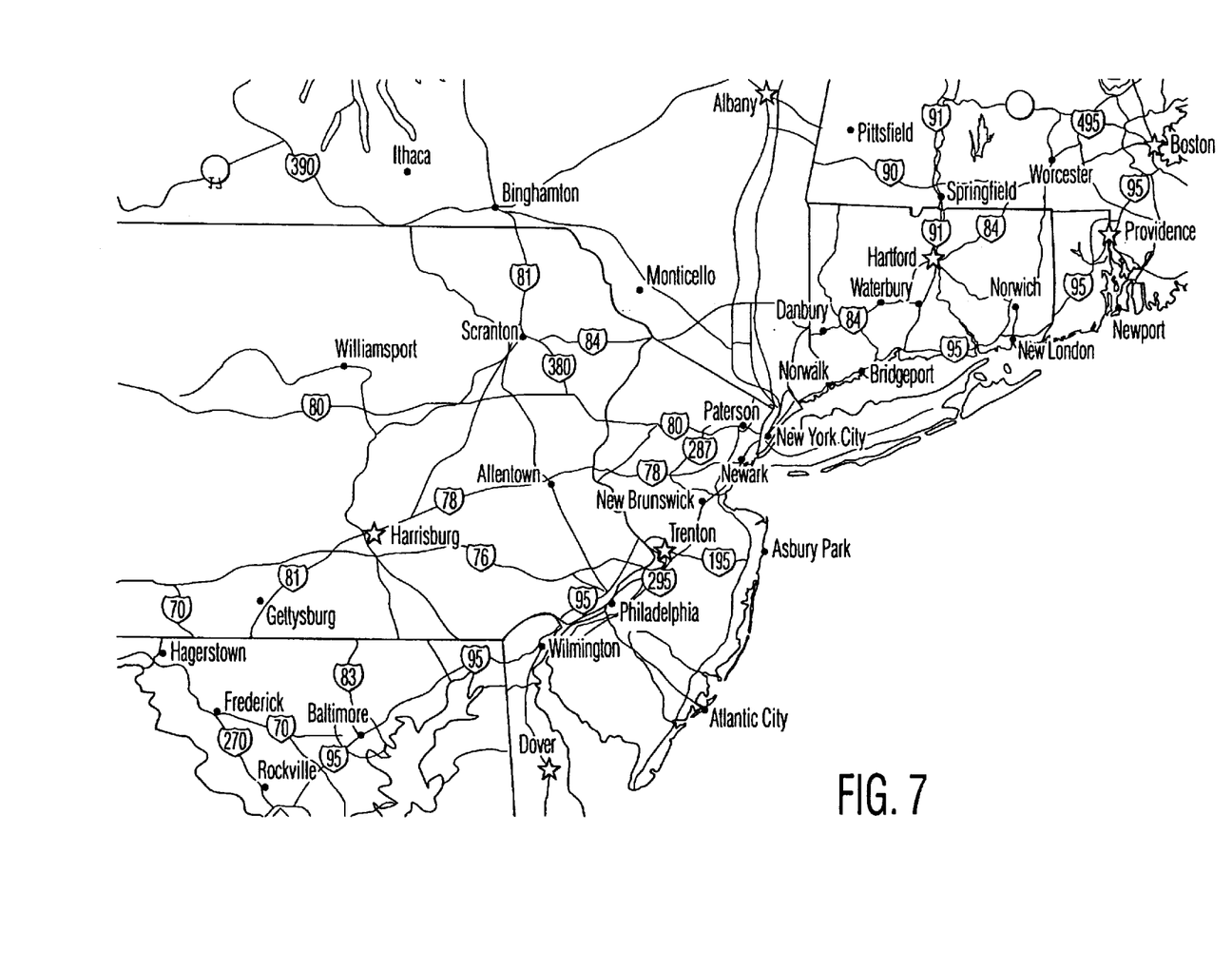
Figure 8:
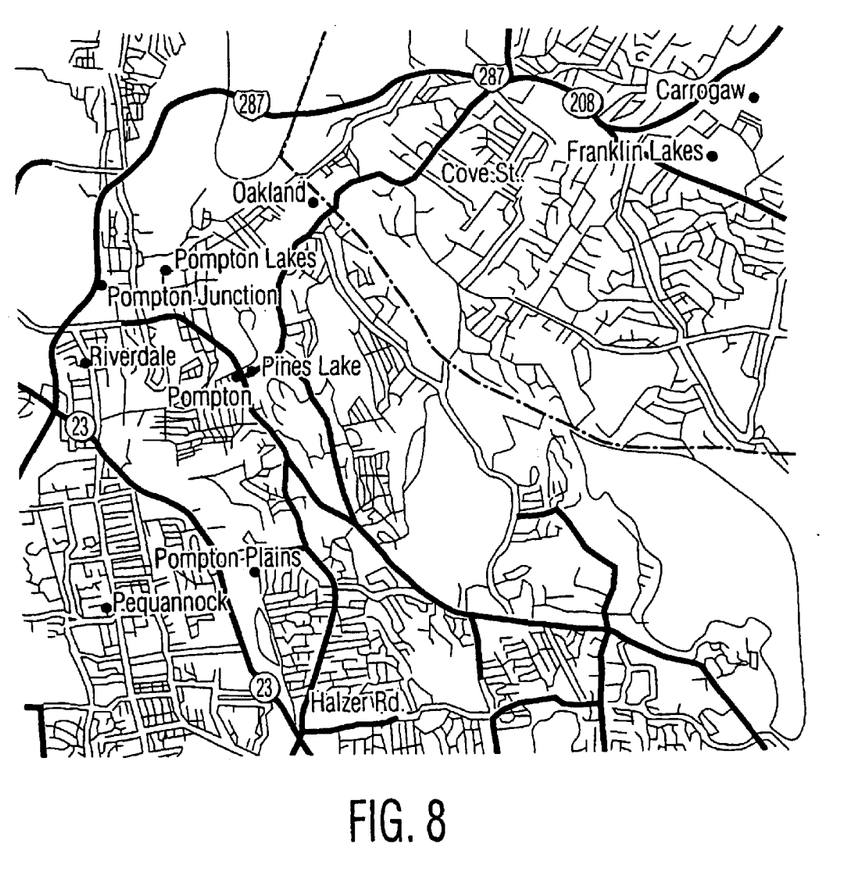

FIGS. 6–8 show digital images produced by the dynamic map program 42. As shown in FIG. 6, a map of the northeast coast of the United States is displayed. FIG. 7 shows a "zoomed" version of the northeast coast focused around the state of New Jersey. FIG. 8 show an even further "zoomed" version which is focused on a portion of northern New Jersey. The level of detail, i.e., individual city names or street names, may be modified as desired. Other information such as landmarks, historical cites, businesses, parks, hospitals, and government buildings may also be displayed.

The coordinate data 43 is a database of position information correlated to the map produced by the dynamic map program. The position information includes latitude and longitude coordinates for various points on the map generated by the dynamic map program 42. In addition, position information relating to web pages is included as discussed further below. Coordinate/position information may be updated/received from a GPS receiver/database 45.

In one embodiment, the GPS receiver/database 45 gathers information from one or more GPS receivers that are used to maintain a database of coordinate information. The Global Positioning System (GPS) is a radio navigational aid using multiple satellites in high orbit around the earth with position fixes determined by range and range-rate measurements. GPS provides extremely accurate position and velocity information to users around the world. Satellites, maintained by the U.S. government, transmit coded radio frequency (RF) signals to earth-based GPS receivers. Highly accurate (within several meters) position determinations (i.e., longitude and latitude coordinates) are based on measurements of propagation times of the RF signals from the satellites.

In a preferred embodiment, web pages are created/designed using GPS-type coordinate data. The accuracy of the GPS system provides for unique information to be associated with each web page. For example, a company located at latitude 740000 and longitude 720000 may create a web page with a name such as lo740000la720000.html, la740000lo720000.html, 7400001-720000.html, or the like. The coordinate/position information is preferably obtained using a GPS receiver. Of course, the coordinate/position information can be obtained from other sources such as a CD ROM or via the Internet 30.

In another embodiment, the web pages need not be created with names based upon latitude and longitude information. The coordinate data 43 may include a link index pointing to different web pages based on coordinate information as in the shown in the example below.

Index array:
   740000, 720000→www.sample-1.com/MyShop.html
   740002, 720001→www.sample-2.com/Mycompany.html
   740022, 720010→www.sample-3.com/MyfoodStore.html Alternatively, the web page may include the position information as background information in a HTML tag (i.e., a metatag), which is accessible by the search engine 44. In this embodiment, the search engine 44 extracts the position information from the web page so that the web page can be located based on GPS-type position information. As discussed above, the web pages themselves are created using, or include, position/coordinate information.

In practice, a third-party, interested in setting up a position-based web page may obtain position coordinates using a GPS system. The position coordinates may be for the party's business address, residence or server location, for example. A web page is then created/designed using the location coordinates thus obtained. Preferably the web page name has the following format: loXXXlaYYY.html. The XXX following "lo" represents the longitude coordinate. The YYY following the "la" represents the latitude coordinate. Of course, other formats, as discussed above, can also be used.

The web page is then made available on a server or search engine, e.g., the GPS-server 40, attached to the Internet 30 using a conventional protocol. Alternatively, and depending on the GPS-server 40, the third party can register an index value comprising a latitude and longitude value that points to the desired web page. This allows an existing web site to be associated with position information.

Figure 4:
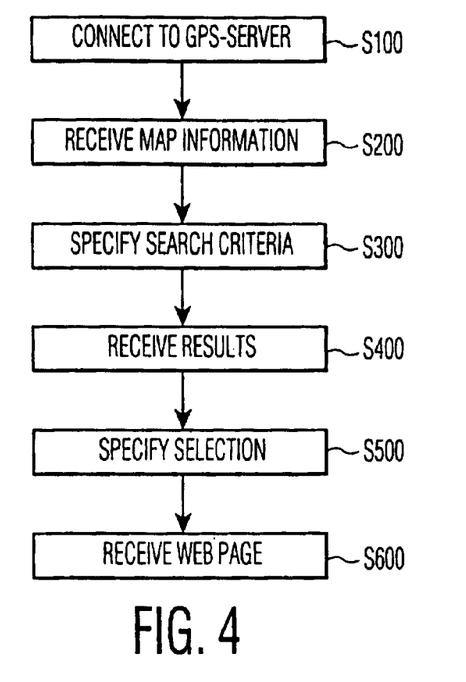
FIG. 4 is a flow chart of a method in accordance with a preferred embodiment of the invention.

FIG. 4 is a flow diagram showing steps for searching for web pages based on position information. In step S100 the client 10 connects to the GPS-server 40 through the Internet 30 using the browser 19. The client 10 can access the GPS-server 40, for example, by specifying the URL of the GPS-server 40 (e.g., www.gps-sever.com). The browser 19 then receives and displays a global map of world (see, e.g., FIGS. 6–8) which includes latitudes and longitude coordinate data in step S200. The latitudes and longitude coordinates, however, may or not be displayed depending on the preference of the client 10. Initially, a default map may be displayed or the client 10 may select a map of a particular geographic region. The default map may be based on the geographic position automatically received from the client 10, if such information is available from the client 10.

As shown in FIG. 3, the browser 19 includes Graphical User Interface (GUI) and map control routines for processing the received map from the GPS-server 40 in a dynamic manner. As discussed above, the displayed map may be "zoomed" in or out to display more or less detail.

In step S300, search criteria are entered by the client 10. A specific point on the map may be designated by selecting a point using the pointing device 18 or typing the name of a location using the keyboard 17. For example, the client 10 may navigate to a specific location using a computer mouse and click on the point to indicate a selection. The position coordinates of the selected point are translated and used by the GPS-server 40 to perform the search.

It should also be noted that other search criteria may also be entered, for example:
   all web pages within a specified radius of a designated point;
   all web pages within a specified radius which belong to a specific category such as grocery stores, toy stores or department stores;
   all web pages within a designated state or city;
   all web pages above or below a certain latitude;
   all web pages within a designated area (e.g., a triangle or square drawn on the map);
   all web pages within a first designated area excluding all web pages within a second designated area; and
   locate a web page having an entered latitude and longitude.

The GPS-server 40 then implements a search in accordance with the entered search criteria, e.g., latitude and longitude values. In step S400, the GPS-server 40 provides the client 10 with the search results. The search engine 44 executes the search by obtaining the position information related to a web page from (1) the html page names, (2) searching the index list of latitudes and longitudes, or (3) extracting and analyzing the background position information associated with the web page.

The search result may be provided as a list of hypertext documents or thumbnail icon images representing each of the hypertext documents that fall within the specified geographic region. The browser 19 then displays the list or thumbnail icons at their respective coordinates on the display map. Brief descriptions of the hypertext documents may be included to identify the them. In step S500, a particular hypertext document is selected, e.g., by double clicking on a chosen icon. The GPS-server 40 then downloads, in step S600, the hypertext document corresponding to the selected icon to the client 10.

Figure 5:
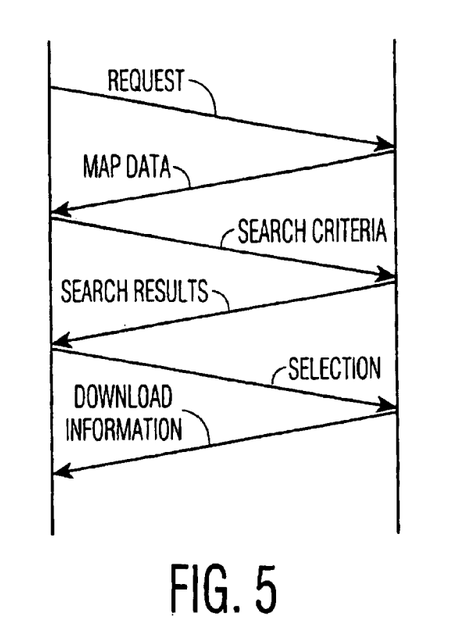
FIG. 5 is a data flow diagram of a client/server network in accordance with a preferred embodiment of the invention.

FIG. 5 illustrates the typical data flow between the client 10 and the GPS-server 40. The data flow/exchange substantially corresponds to the description given above in relation to FIG. 4.

The client 10 can thus browse the Internet 30 using mapping/position coordinates. Since each web page generated for any location is unique, the client 10 need not know the web site name or URL (i.e., address path). All that is needed to search is the geographic location information which is directly obtained/selectable using the displayed map.

In another embodiment, reverse position searches may be performed. Illustratively, the client 10 may have an approximate position based upon the position of a landmark, building, address or proximity to a web page based upon geographic information. For example, the Client 10 may have performed a geographic search and determined that a web page from a department store is nearby. The client 10 then requests the GPS-server 40 to determine the position of the client 10 based upon information obtained from the department store web page. This allows the client 10 to receive GPS-based position information from a web site or the GPS-server 40 to determine the geographic position of the client 10.

In addition, a mobile client system (e.g., a laptop computer) may determine highly accurate position information based on position information received from the GPS-server 40 or located web sites. Triangulation or navigation software (e.g., as used with automobile navigation systems) may be used to facilitate determination of the exact geographic position. Also navigation software such as Philips car-in can connect to web sites that are near the current location using position information received from a GPS receiver.

While the present invention has been described above in terms of specific embodiments, it is to be understood that the invention is not intended to be confined or limited to the embodiments disclosed herein. On the contrary, the present invention is intended to cover various structures and modifications thereof included within the spirit and scope of the appended claims.

What is claimed is:

1. A method for searching for information accessible through a client/server network containing a plurality of servers, comprising the steps of:
    connecting to one of the plurality of servers;
    receiving a graphical map of a geographic area from the server;
    displaying the graphical map on a display device;
    entering search criteria for locating at least one hypertext document based on a geographic position; and
    receiving a search result indicating the hypertext document located in accordance with the search criteria,
    wherein the located hypertext document is accessible from another server different from the one server of the plurality of servers,
    wherein the hypertext document includes geographic position information in a metatag.

2. The method according to claim 1, further comprising the steps of:
    selecting the hypertext document included in the search result; and
    downloading information relating to the selected hypertext document.

3. The method according to claim 2, wherein the hypertext document is a world wide web page and the computer network is the Internet.

4. The method according to claim 3, wherein the method is performed as an aspect of executing a program for browsing the world wide web.

5. The method according to claim 4, wherein the hypertext document includes said geographic position information.

6. The method according to claim 5, wherein the hypertext document has a name based upon the geographic position information.

7. The method of claim 1, wherein the hypertext document includes the geographic position indication as background information.

8. The method of claim 7, wherein the background information is a matatag.

9. The method of claim 1, wherein the geographic position indication is obtained from a GPS system.

10. The method of claim 9, wherein the geographic position indication translate to a business address, residence or server location.

11. A method for providing information through a GPS client/server network, comprising the steps of:
    receiving a connection request from a client;
    generating a graphic map based upon a geographic area;
    transmitting the graphic map to the client;
    receiving search criteria for locating a world wide web page based upon a geographic position;
    searching the world wide web in accordance with the received search criteria; and
    transmitting a search result to the client,
    receiving a client position information request from the client, wherein a first geographic position identifiable by the client and the search result for the search criteria is used for determining a geographic position of the client using the GPS client/server network.

12. The method according to claim 11, further comprising the steps of:
    receiving a connection request to a web page included in the search result; and
    connecting the client to the selected web page.

13. The method according to claim 11, wherein said searching step includes searching in accordance with longitude and latitude coordinates.

14. The method according to claim 11, wherein said search step includes searching for the web page based on geographic position information included in the web page.

15. The method according to claim 14, wherein the web page has a name based upon the geographic position information.

16. The method according to claim 11, wherein said search step includes searching an index including position information and web page names.

17. The method according to claim 11, wherein the search result includes an icon image representing the web page.

18. A server for providing information which is accessible through a computer network, comprising:
    a controller including an interface to the computer network;

- a graphical mapping system responsive to said controller capable of generating a map of a geographic area for transmission through said interface;
- a search engine configured to locate a hypertext document in the computer network in accordance with a request received through said interface, wherein said hypetext document includes a geographic position information in a metatag, wherein said geographic position information relates to a business/residence address or server location; and
- an index including position information and hyperlinks, wherein said search engine is further configured to locate the hypertext document by searching said index,
- wherein the request includes search criteria based upon geographic position.

19. The server according to claim 18, wherein the hypertext document is a world wide web page and the computer network is the Internet.

20. The server according to claim 18, wherein said controller is adapted to download the hypertext document located by said search engine to a client through said interface.

21. The server according to claim 18, wherein the hypertext document includes said geographic position information.

22. The server according to claim 21, wherein the hypertext document has a name based upon the geographic position information.

23. The server according to claim 18, further comprising a coordinate database including coordinate information correlated to the map generated by said graphical mapping system.

24. The server according to claim 23, wherein the coordinate information includes latitude and longitude coordinates.

25. The server according to claim 24, wherein the coordinate information is updated using a Global Positioning System.

26. The server according to claim 18, wherein said controller is further configured to provide reverse-position information for determining a position of a client.

* * * * *